US011261361B2

(12) United States Patent
Frederick et al.

(10) Patent No.: US 11,261,361 B2
(45) Date of Patent: Mar. 1, 2022

(54) SALT TOLERANT FRICTION REDUCER

(71) Applicant: SOLVAY USA INC., Princeton, NJ (US)

(72) Inventors: Kevin Frederick, Evans City, PA (US); Shih-Ruey Chen, Studio City, CA (US); Randy Loeffler, Carnegie, PA (US)

(73) Assignee: SOLVAY USA INC., Cranbury, NJ (US)

( * ) Notice: Subject to any disclaimer, the term of this patent is extended or adjusted under 35 U.S.C. 154(b) by 130 days.

(21) Appl. No.: 16/524,746

(22) Filed: Jul. 29, 2019

(65) Prior Publication Data

US 2020/0024497 A1 Jan. 23, 2020

Related U.S. Application Data

(63) Continuation of application No. 15/818,995, filed on Nov. 21, 2017, now abandoned, which is a continuation of application No. 14/291,907, filed on May 30, 2014, now abandoned.

(60) Provisional application No. 61/829,777, filed on May 31, 2013.

(51) Int. Cl.

| | |
|---|---|
| ***C09K 8/68*** | (2006.01) |
| ***C09K 8/00*** | (2006.01) |
| ***C09K 8/60*** | (2006.01) |
| ***C09K 8/88*** | (2006.01) |
| ***C09K 8/86*** | (2006.01) |

(52) U.S. Cl.

CPC ................ *C09K 8/00* (2013.01); *C09K 8/602* (2013.01); *C09K 8/68* (2013.01); *C09K 8/86* (2013.01); *C09K 8/88* (2013.01); *C09K 2208/34* (2013.01)

(58) Field of Classification Search

CPC ...... C09K 2208/34; C09K 8/00; C09K 8/602; C09K 8/68; C09K 8/86; C09K 8/88

See application file for complete search history.

(56) References Cited

U.S. PATENT DOCUMENTS

| | | | | | |
|---|---|---|---|---|---|
| 3,067,987 | A | 12/1962 | Ballou et al. | | |
| 3,284,393 | A | 11/1966 | Vanderhoff et al. | | |
| 3,624,919 | A | 12/1971 | Miller | | |
| 4,024,097 | A | 5/1977 | Slovinsky et al. | | |
| 4,051,065 | A | 9/1977 | Venema | | |
| 4,059,552 | A | 11/1977 | Zweigle et al. | | |
| 4,419,344 | A | 12/1983 | Strasilla et al. | | |
| 4,522,502 | A | 6/1985 | Brazelton | | |
| 4,642,222 | A | 2/1987 | Brazelton | | |
| 4,672,090 | A | 6/1987 | Chan | | |
| 4,713,431 | A | 12/1987 | Bhattacharyya et al. | | |
| 4,747,691 | A | 5/1988 | Hoffland | | |
| 4,772,659 | A | 9/1988 | Chan | | |
| 5,292,800 | A | 3/1994 | Moench | | |
| 5,470,150 | A | 11/1995 | Pardikes | | |
| 6,825,301 | B1 | 11/2004 | Cerf et al. | | |
| 7,004,254 | B1 * | 2/2006 | Chatterji | C09K 8/12 | 166/279 |
| 7,482,310 | B1 * | 1/2009 | Reese | C09K 8/64 | 166/270 |
| 2003/0191030 | A1 * | 10/2003 | Blair | C09K 8/68 | 507/225 |
| 2010/0307753 | A1 * | 12/2010 | Rey | C09K 8/68 | 166/305.1 |

* cited by examiner

*Primary Examiner* — Alicia Bland

(74) *Attorney, Agent, or Firm* — Osha Bergman Watanabe & Burton LLP

(57) ABSTRACT

A friction reducing treatment solution that includes water, from 100 to 500,000 ppm of total dissolved solids, and from 0.5 to 3 gallons per thousand gallons of a water-in-oil emulsion containing a water soluble polymer. The total dissolved solids include at least 10 weight percent of a multivalent cation. The water-in-oil emulsion includes an oil phase and an aqueous phase, where the oil phase is a continuous phase containing an inert hydrophobic liquid and the aqueous phase is present as dispersed distinct particles in the oil phase and contains water, the water soluble polymer, and surfactants and an inverting surfactant. The water soluble polymer is made up of 30 to 60 weight percent of a non-ionic monomer, 5 to 50 weight percent of a sulfonic acid containing monomer, and 10 to 60 weight percent of a cationic monomer and makes up from 5 to 40 weight percent of the water-in-oil emulsion.

21 Claims, No Drawings

SALT TOLERANT FRICTION REDUCER

REFERENCE TO RELATED APPLICATION

This application is a continuation of U.S. patent application Ser. No. 15/818,995, filed Nov. 21, 2017, which is a continuation of U.S. patent application Ser. No. 14/291,907, filed May 30, 2014, which claims the benefit of priority of U.S. Provisional Patent Application Ser. No. 61/829,777 filed May 31, 2013. The disclosures of all of which are herein incorporated by reference in their entireties.

BACKGROUND OF THE INVENTION

1. Field of the Invention

The present invention relates to compositions for treating subterranean zones. The compositions include aqueous subterranean treatment fluids that contain water soluble polymers in a water-in-oil emulsion in high brine containing solutions and associated methods.

2. Description of the Prior Art

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

Viscous gelled fracturing fluids are commonly utilized in the hydraulic fracturing of subterranean zones penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone. The fracturing fluid also carries particulate proppant material, e.g., graded sand, into the formed fractures. The proppant material is suspended in the viscous fracturing fluid so that the proppant material is deposited in the fractures when the viscous fracturing fluid is broken and recovered. The proppant material functions to prevent the fractures from closing whereby conductive channels are formed through which produced fluids can flow to the well bore.

An example of a stimulation operation utilizing an aqueous treatment fluid is hydraulic fracturing. In some instances, a fracturing treatment involves pumping a proppant-free, aqueous treatment fluid (known as a pad fluid) into a subterranean formation faster than the fluid can escape into the formation so that the pressure in the formation rises and the formation breaks, creating or enhancing one or more fractures. Enhancing a fracture includes enlarging a pre-existing fracture in the formation. Once the fracture is formed or enhanced, proppant particulates are generally placed into the fracture to form a proppant pack that may prevent the fracture from closing when the hydraulic pressure is released, forming conductive channels through which fluids may flow to the well bore.

During the pumping of the aqueous treatment fluid into the well bore, a considerable amount of energy may be lost due to friction between the aqueous treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The friction reducing polymer should reduce the frictional losses due to friction between the aqueous treatment fluid in turbulent flow and the tubular goods and/or the formation.

Many friction reducing polymers show a reduced performance in the presence of low molecular weight additives, such as acids, bases, and salts. Ionically-charged polymers are particularly susceptible. For example, polymers containing acrylate-type monomers, either added as a copolymer or hydrolyzed from polyacrylamide, have a reduced compatibility with high calcium brines. The additives screen the charges on the polymer backbone which decreases the hydrodynamic radius of the polymer. With the decrease in effective polymer length, the friction reduction also decreases.

Hydraulic fracturing has been a boon to the oil and gas industry. Many oil and gas wells have been made more productive due to the procedure. However, the hydraulic fracturing business is now facing increasing scrutiny and government regulation. In addition, large volumes of water are required for hydraulic fracturing operations. Fresh water may be a limiting factor in some areas. A treatment solution that can use a variety of water sources, such as produced water from the formation or flowback water after a well treatment, could significantly enhance the field applicability.

The relatively high polymer usage in subterranean treatment methods can result in significant formation damage. Further, when the treatment fluid is recycled above ground, the high levels of high molecular weight polymers in the fluid can lead to flocculation in above ground fluid recycle operations such as terminal upsets.

There is an ongoing need to develop treatment solutions that have effective friction reduction to minimize energy loss but yet have sufficient viscosity for proppant-carrying capacity, especially in high brine situations, while being safe and environmentally friendly.

SUMMARY OF THE INVENTION

The present invention provides a friction reducing treatment solution that includes water, from 100, in many cases from 10,000 to 300,000, in some cases up to about 500,000 ppm of total dissolved solids, and from 0.5 to 3 gallons per thousand gallons of a water-in-oil emulsion containing a water soluble polymer. The total dissolved solids include at least 10 weight percent of a multivalent cation. The water-in-oil emulsion includes an oil phase (O) and an aqueous phase (A) at an O/A ratio of from about 1:8 to about 10:1, where the oil phase is a continuous phase containing an inert hydrophobic liquid and the aqueous phase is present as dispersed distinct particles in the oil phase and contains water, the water soluble polymer, and surfactants and an inverting surfactant. The water soluble polymer is made up of 30 to 60 weight percent of a non-ionic monomer, 5 to 50 weight percent of a sulfonic acid containing monomer, and 10 to 60 weight percent of a cationic monomer. The water soluble polymer comprises from 5 to 40 weight percent of the water-in-oil emulsion.

The present invention is also directed to a method of treating a portion of a subterranean formation that includes introducing the friction reducing treatment solution into the portion of the subterranean formation.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "(meth)acrylic" and "(meth) acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass oligomer, and includes, without limitation, both homopolymers and copolymers.

As used herein, the term "copolymer," as used herein, is not limited to polymers containing two types of monomeric units, but includes any combination of polymers, e.g., terpolymers, tetrapolymers, and the like.

As used herein, the term "flowback water" refers to fluids that flow back to the surface after treatment fluids are injected down hole.

As used herein, "total dissolved solids" ("TDS") refers to a measure of the combined content of all inorganic and organic substances contained in water including ionized solids in the water.

As used herein, the term "brine" refers to water containing dissolved salt and at least 10,000 ppm TDS.

The present invention provides a friction reducing treatment solution that includes water, from 100, in many cases from 10,000 to 300,000, in some cases up to about 500,000 ppm of total dissolved solids, and from 0.5 to 3 gallons per thousand gallons of a water-in-oil emulsion containing a water soluble polymer. The total dissolved solids include at least 10 weight percent of a multivalent cation. The water-in-oil emulsion includes an oil phase (O) and an aqueous phase (A) at an O/A ratio of from about 1:8 to about 10:1, where the oil phase is a continuous phase containing an inert hydrophobic liquid and the aqueous phase is present as dispersed distinct particles in the oil phase and contains water, the water soluble polymer, and surfactants and an inverting surfactant. The water soluble polymer is made up of 30 to 60 weight percent of a non-ionic monomer, 5 to 50 weight percent of a sulfonic acid containing monomer, and 10 to 60 weight percent of a cationic monomer. The water soluble polymer comprises from 5 to 40 weight percent of the water-in-oil emulsion.

The present invention provides a method of treating a portion of a subterranean formation that includes introducing the friction reducing treatment solution into the portion of the subterranean formation.

The aqueous friction reducing treatment solution of the present invention generally include water, and a friction reducing copolymer.

The water-in-oil emulsion includes an oil phase, an aqueous phase and surfactants. The oil phase (O) and the aqueous phase (A) can be present at an O/A ratio, based on the volume of each phase of from al least about 1:8, in some cases at least about 1:6 and in other cases at least about 1:4 and can be up to about 10:1, in some cases up to about 8:1 and in other cases up to about 6:1. When the O/A ratio is too oil heavy, the polymer may be too concentrated in the aqueous phase. When the O/A ratio is too water heavy, the emulsion may become unstable and prone to separate. The O/A ratio can be any ratio or range between any of the ratios recited above.

In the present water-in-oil emulsion, the oil phase is present as a continuous phase and includes an inert hydrophobic liquid. The inert hydrophobic liquid can include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils such as the branch-chain isoparaffinic solvent available as ISOPAR® M and EXXATE® available from ExxonMobile Corporation, Irving Tex., a narrow fraction of a branch-chain hydrocarbon available as KENSOL® 61 from Witco Chemical Company, New York, N.Y., mineral oil, available commercially as BLANDOL® from Witco, CALUMET™ LVP-100 available from Calumet Specialty Products, Burnham, Ill., DRAKEOL® from Penreco Partnership, Houston, Tex., MAGIESOL® from Magie Bros., Oil City, Pa. and vegetable oils such as canola oil, coconut oil, rapeseed oil and the like.

The inert hydrophobic liquid is present in the water-in-oil emulsion in an amount sufficient to form a stable emulsion. In some embodiments, the inert hydrophobic liquid can be present in the water-in-oil emulsions in an amount in the range of from about 15% to about 80% by weight.

In embodiments of the invention, the inert hydrophobic liquid is present in the water-in-oil emulsion at a level of at least about 15, in some cases at least about 17.5, in other cases at least about 20, and in some instances at least about 22.5 weight percent based on the weight of the water-in-oil emulsion and can be present at up to about 40, in some cases up to about 35, in other cases up to about 32.5 and in some instances up to about 30 weight percent based on the weight of the water-in-oil emulsion. The total amount of inert hydrophobic liquid in the water-in-oil emulsion can be any value or can range between any of the values recited above.

Any suitable water-in-oil emulsifier can be used as the one or more surfactants used to make the water soluble polymer containing water-in-oil emulsion used in the present method. In embodiments of the invention, the surfactants include those having an HLB (hydrophilic-lipophilic balance) value between 2 and 10 in some cases between 3 and 9 and in other cases between 3 and 7.

As used herein, HLB is calculated using the art known method of calculating a value based on the chemical groups of the molecule. The method uses the following equation:

$$HLB=7+m*Hh+n*Hl$$

where m represents the number of hydrophilic groups in the molecule, Hh represents the value of the hydrophilic groups, n represents the number of lipophilic groups in the molecule and Hl represents the value of the lipophilic groups.

Non-limiting examples of suitable surfactants include:

fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol;

fatty acid esters of sorbitan, for instance sorbitan monoleate, sorbitan dioleate, sorbitan trioleate, sorbitan monostearate and sorbitan tristearate;

fatty acid esters of mannitol, for instance mannitol monolaurate or mannitol monopalmitate;

fatty acid esters of pentaerythritol, for instance pentaerythritol monomyristate, pentaerythritol monopalmitate and pentaerythritol dipalmitate;

fatty acid esters of polyethylene glycol sorbitan, more particularly the monooleates;

fatty acid esters of polyethylene glycol mannitol, more particularly the monooleates and trioleates;

fatty acid esters of glucose, for instance glucose monooleate and glucose monostearate;

trimethylolpropane distearate;

the products of reaction of isopropylamide with oleic acid;

fatty acid esters of glycerol sorbitan;

ethoxylated alkylaines;

sodium hexadecyl phthalate;

sodium decyl phthalate; and oil-soluble alkanolamides.

In particular embodiments of the invention, the surfactants can include ethoxylated nonionic surfactants, guerbet alcohol ethoxylate, and mixtures thereof. Specific examples include, but are not limited to tall oil fatty acid diethanolamine, such as those available as AMADOL® 511, from Akzo Nobel Surface Chemistry, Chicago, Ill.; polyoxyethylene (5) sorbitan monoleate, available as TWEEN® 81, from Uniqema, New Castle, Del.; sorbinate monoleate, available as SPAN® 80 from Uniquena, and ALKAMULS® SMO, from Rhone Poulenc, Inc., Paris, France.

The surfactants can be present at a level of at least about 0.1, in some instances at least about 0.25, in other instances at least about 0.5, in some cases at least about 0.75 and in other cases at least about 1 weight percent of the water-in-oil emulsion. When the amount of surfactants is too low, the aqueous phase may not be adequately dispersed in the oil phase and/or the water-in-oil emulsion may tend to separate into oil and aqueous phases. Also, the amount of surfactants can be up to about 7, in some cases up to about 5, and in other cases up to about 2.5 weight percent of the water-in-oil emulsion. The amount of surfactants in the water-in-oil emulsion can be any value or can range between any of the values recited above.

The aqueous phase is a dispersed phase of distinct particles in the oil phase and includes water and a water soluble polymer. The aqueous phase in total can be present in the present water-in-oil emulsion polymer composition at a level of at least about 60, in some instances at least about 65, in some cases at least about 67.5, and in other cases at least about 70 weight percent based on the weight of the water-in-oil emulsion and can be present at up to about 85, in some cases up to about 82.5, in other cases up to about 80 and in some instances up to about 77.5 weight percent based on the weight of the water-in-oil emulsion. The total amount of aqueous phase in the water-in-oil emulsion can be any value or can range between any of the values recited above.

In the present invention, the water soluble polymer is present at a level of at least about 5, in some instances 10, in some cases at least about 15, and in other cases at least about 20 weight percent based on the weight of the water-in-oil emulsion and can be present at up to about 33, in some cases up to about 35, in other cases up to about 37 and in some instances up to about 40 weight percent based on the weight of the water-in-oil emulsion. When the amount of water soluble polymer is too low, the use of the water-in-oil emulsion in the present method of treating a portion of a subterranean formation may be uneconomical. When the amount of water soluble polymer is too high, the performance of the water soluble polymer in the present method of treating a portion of a subterranean formation may be less than optimal. The amount of water soluble polymer in the aqueous phase of the water-in-oil emulsion can be any value or can range between any of the values recited above.

The water soluble polymer in the water-in-oil emulsion is prepared by polymerizing a monomer solution that includes non-ionic monomers, cationic monomers and sulfonic acid containing monomers included at a level that provides the desired amount of water soluble polymer.

The amount of non-ionic monomer can be at least about 30, in some cases at least about 33, and in other cases at least about 35 weight percent based on the weight of the monomer mixture. When the amount of non-ionic monomer is too low, the molecular weight of the resulting water soluble polymer may be lower than desired. Also, the amount of non-ionic monomer in the monomer mixture can be up to about 60, in some case up to about 57.5, and in other cases up to about 55 weight percent based on the weight of the monomer mixture. When the amount of non-ionic monomer is too high, the water soluble polymer may not carry enough ionic charge to optimally function as a friction reducing polymer. The amount of non-ionic monomer in the monomer mixture can be any value or range between any of the values recited above.

The monomer mixture typically includes (meth)acrylamide as a non-ionic monomer.

The water soluble polymer can include other non-ionic monomers to provide desirable properties to the polymer. Non-limiting examples of suitable other non-ionic monomers that can be included in the monomer mixture, and ultimately the resulting water soluble polymer include N,N-dimethyl (meth)acrylamide (DMF), N-vinyl acetamide, N-vinyl formamide, acrylonitrile (including hydrolyzed products of acrylonitrile residues), acrylonitrile-dimethyl amine reaction products, and and/or corresponding salts, non-limiting examples being sodium, potassium and/or ammonium and mixtures thereof.

The monomer mixture typically includes a sulfonic acid containing monomer or its corresponding salts, non-limiting examples being sodium, potassium and ammonium. Particular useful examples of sulfonic acid containing monomers include, but are not limited to 2-acrylamido-2-methylpropane sulfonic acid (AMP SA), 2-methacrylamido-2-methylpropane sulfonic acid, sulfonated styrene, vinyl sulfonic acids, and allyl ether sulfonic acids. The amount of sulfonic acid containing monomer can be at least about 5, in some cases at least about 10, and in other cases at least about 15 weight percent based on the weight of the monomer mixture. When the amount of sulfonic acid containing monomer is too low, the water soluble polymer may not carry enough anionic charge to optimally function as a friction reducing polymer in high brine solutions. Also, the amount of sulfonic acid containing monomer in the monomer mixture can be up to about 50, in some case up to about 45, and in other cases up to about 40 weight percent based on the weight of the monomer mixture. When the amount of sulfonic acid containing monomer is too high, the water soluble polymer may have undesirable flocculation properties when used in the present method. The amount of sulfonic acid containing monomer in the monomer mixture can be any value or range between any of the values recited above.

In some embodiments of the present invention, the monomer mixture and/or water soluble polymer does not include (meth)acrylic acid.

The monomer mixture typically includes a cationic monomer or its corresponding salts, non-limiting examples being chloride and methylsulfate. Particular useful examples of such cationic monomers include, but are not limited to (meth)acrylamidopropyltrimethyl ammonium halides, (meth)acryloyloxyethyltrimethyl ammonium halides, N,N-Dimethylaminoethyl (meth)acrylate, (meth)acryloyloxyethyltrimethyl ammonium methyl sulfate, and diallyl dimethyl ammonium halides.

In some embodiments of the invention, the cationic monomer can be a monomer that contains an amine group ("amine containing monomer") that takes on a positive charge at pH levels less than 7, in some cases less than 6 and in other cases less than 5. Non-limiting examples of amine containing monomers that can be used as cationic monomers in the present invention include diallylamine (DAA), methyldiallylamine (MDAA), dimethylaminoethylmethacrylate (DMAEM), and dimethylaminopropylmethacrylamide (DMAPMA).

The amount of cationic monomer can be at least about 10, in some cases at least about 15, and in other cases at least about 20 weight percent based on the weight of the monomer mixture. When the amount of cationic monomer is too low, the water soluble polymer may not carry enough cationic charge to optimally function as a friction reducing polymer in high brine solutions. Also, the amount of cationic monomer in the monomer mixture can be up to about 60, in some case up to about 50, in other cases up to about 40, in some instances up to about 30, and in other instances up to about 25 weight percent based on the weight of the monomer mixture. When the amount of cationic monomer is too high, the water soluble polymer may have undesirable flocculation properties when used in the present method. The amount of cationic monomer in the monomer mixture can be any value or range between any of the values recited above.

Typically, the composition of the water soluble polymer will be the same or about the same as the composition of the monomer mixture.

Not being limited to any single theory, it is believed that the water soluble polymers of the present invention do not decrease their hydrodynamic volume due to the presence of ions in the treatment solution as is the case with prior art water soluble polymers. Because the present water soluble polymers contain anionic groups from the sulfonic acid containing monomers and cationic groups from the cationic monomers, they tend to have a somewhat smaller hydrodynamic volume when no salt ions are present in the treatment fluid. When salt ions are present, they tend to associate with the anionic and cationic groups in the present water soluble polymers causing the hydrodynamic volume of the present water soluble polymers to become larger, which results in more viscosity build and more of a friction reducing effect.

In one embodiments of the present invention, the viscosity build and friction reducing effect is increased when the molar ration of cationic monomer to sulfonic acid containing monomer is at least 1.5:1, in some cases at least 1.75:1 and in other cases at least 2:1.

In other embodiments of the present invention, the viscosity build and friction reducing effect is increased when the molar ration of cationic monomer to sulfonic acid containing monomer is not more than 1:1.5, in some cases not more than 1:1.75 and in other cases not more than 1:2.

The water-in-oil emulsion of the present invention can be made down into a 2 wt % aqueous solution of the inverted water-in-oil emulsion. The bulk viscosity of the solution can be measured at 25° C. using a Brookfield RV instrument equipped with an appropriate spindle at 10 rpm at 25° C. Brookfield Engineering Laboratories, Inc., Middleboro, Mass.).

Thus, the water soluble polymers in the dispersed aqueous phase particles of the present water-in-oil emulsion are able to provide a greater friction reducing effect by reducing the energy losses due to friction in brine containing aqueous treatment fluids of the present invention. As a non-limiting example, the water soluble polymers of the present invention can reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore.

The water-in-oil emulsion containing the water soluble polymer of the present method is prepared using water-in-oil emulsion polymerization techniques. Suitable methods to effect such polymerizations are known in the art, non-limiting examples of such being disclosed in U.S. Pat. Nos. 3,284,393; 4,024,097; 4,059,552; 4,419,344; 4,672,090; 4,713,431; 4,772,659; 5,292,800; and 6,825,301, the relevant disclosures of which are incorporated herein by reference.

Typically, the water-in-oil polymerization is carried out by mixing the surfactants with the oil phase, which contains the inert hydrophobic liquid. The aqueous phase is then prepared combining a monomer mixture with water in the desired concentration. Additionally, a chelant, such as a sodium salt of EDTA can optionally be added to the aqueous phase and the pH of the aqueous phase can be adjusted to 3.0 to 10.0, depending on the particular monomer(s) in the monomer mixture. The aqueous phase is then added to the mixture of oil phase and surfactants. The surfactants enable the aqueous phase, which contains the monomer mixture, to be emulsified into and form discrete particles in the oil phase. Polymerization is then carried out in the presence of a free radical generating initiator.

Any suitable initiator can be used. Non-limiting examples of suitable initiators include diethyl 2,2'-azobisisobutyrate, dimethyl 2,2'-azobisisobutyrate, 2-methyl 2'-ethyl azobisisobutyrate, benzoyl peroxide, lauroyl peroxide, sodium persulfate, potassium persulfate, tert-butyl hydroperoxide, dimethane sulfonyl peroxide, ammonium persulfate, azobisisobutylronitrile, dimethyl 2,2'-azobis (isobutyrate) and combinations thereof.

The amount of initiator can be from about 0.01 to 1% by weight of the monomer mixture, in some cases from 0.02% to 0.5% by weight of the monomer mixture.

In some embodiments of the invention, the polymerization technique may have an initiation temperature of about 25° C. and proceed approximately adiabatically. In other embodiments of the invention, the polymerization can be carried out isothermally at a temperature of about from 37° C. to about 50° C.

In some embodiments, the oil-in-water emulsion can include a salt. Among other things, the salt can be present to add stability to the emulsion and/or reduced viscosity of the emulsion. Examples of suitable salts, include, but are not limited to, ammonium chloride, potassium chloride, sodium chloride, ammonium sulfate, and mixtures thereof. In some embodiments, the salt can be present in emulsions in an amount in the range of from about 0.5% to about 2.5% by weight of the emulsion.

In some embodiments, the oil-in-water emulsions can include an inhibitor. Among other things, the inhibitor can be included to prevent premature polymerization of the monomers prior to initiation of the emulsion polymerization reaction. As those of ordinary skill in the art will appreciate, with the benefit of this disclosure, the water soluble polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

The water soluble polymers of the present invention typically have a molecular weight sufficient to provide a desired level of friction reduction. Generally, friction reducing polymers have a higher molecular weight in order to provide a desirable level of friction reduction. As a non-limiting example, the weight average molecular weight of the friction reducing copolymers may be in the range of from about 2,000,000 to about 20,000,000, in some cases up to about 30,000,000, as determined using intrinsic viscosities. Those of ordinary skill in the art will recognize that friction reducing copolymers having molecular weights outside the listed range may still provide some degree of friction reduction in an aqueous treatment fluid.

As used herein, intrinsic viscosity is determined using a Ubbelhhde Capillary Viscometer and solutions of the water soluble polymer in 1M NaCl solution, at 30° C., and pH 7 at 0.05 wt %, 0.025 wt % and 0.01 wt % and extrapolating the measured values to zero concentration to determine the intrinsic viscosity. The molecular weight of the water soluble polymer is then determined using the Mark-Houwink equation as is known in the art.

Alternatively, the reduced viscosity of the water soluble polymer at 0.05 wt % concentration is used to measure molecular size. As such, the water soluble polymer has a reduced viscosity, as determined in a Ubbelhhde Capillary Viscometer at 0.05% by weight concentration of the polymer in 1M NaCl solution, at 30° C., pH 7, of from about 10 to about 40 dl/g, in some cases from 15 to about 35 dl/g, and in other cases 15 to about 30 dl/g.

Suitable water soluble polymers of the present invention can be in an acid form or in a salt form. A variety of salts can be made by neutralizing the acid form sulfonic acid containing monomer with a base, such as sodium hydroxide, potassium hydroxide, ammonium hydroxide or the like. As used herein, the term "water soluble polymer" is intended to include both the acid form of the friction reducing copolymer and its various salts.

The water-in-oil emulsion is added to water by inverting the emulsion to form a friction reducing treatment solution. As used herein, the terms "invert" and/or "inverting" refer to exposing the water-in-oil emulsion to conditions that cause the aqueous phase to become the continuous phase. This inversion releases the water soluble polymer into the make-up water.

Methods of inverting water soluble polymer containing water-in-oil emulsions are known in the art and are disclosed, as a non-limiting example in U.S. Pat. No. 3,624,019 which is incorporated herein by reference.

In embodiments of the invention, in order to aid the inversion, make down and dissolution of the water soluble polymer, an inverting surfactant can be included in the water-in-oil emulsion. Among other things, the inverting surfactant can facilitate the inverting of the emulsion upon addition to make up water and/or the aqueous treatment fluids of the present invention. As those of ordinary skill in the art will appreciate, with the benefit of this disclosure, upon addition to the aqueous treatment fluid, the water-in-oil emulsion should invert, releasing the copolymer into the aqueous treatment fluid.

Non-limiting examples of suitable inverting surfactants include, polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, and sorbitol-anhydride).

In particular embodiments of the invention, the inverting surfactants can include ethoxylated nonyl phenols, ethoxylated nonyl phenol formaldehyde resins, ethoxylated alcohols, nonionic surfactants with an HLB of from 12 to 14, and mixtures thereof.

A specific non-limiting example of a suitable inverting surfactant includes an ethoxylated $C_{12}$-$C_{16}$ alcohol. In some aspects of the invention, the inverting surfactant can be a $C_{12}$-$C_{14}$ alcohol having 5 to 10 moles of ethoxylation. The inverting surfactant can be present in an amount sufficient to provide the desired inversion of the emulsion upon contact with the water in the aqueous treatment fluid. In some embodiments, the inverting surfactant can be present in an amount in the range of from about 1%, in some cases about 1.1%, in other cases about 1.25% and can be up to about 5%, in some cases about 4%, in other cases about 3%, in some instances about 2% and in other instances about 1.75% by weight of the water-in-oil emulsion.

In many embodiments of the invention, the inverting surfactants are added to the water-in-oil emulsion after the polymerization is completed.

In some embodiments of the invention, a batch method can be used to make down the water-in-oil emulsion. In this embodiment, the water soluble polymer containing water-in-oil emulsion and water are delivered to a common mixing tank. Once in the tank, the solution is beat or mixed for a specific length of time in order to impart energy thereto.

After mixing, the resulting solution must age to allow enough time for the molecules to unwind. This period of time is significantly reduced in the present invention.

In other embodiments of the invention, continuous in-line mixers as well as in-line static mixers can be used to combine the water soluble polymer containing water-in-oil emulsion and water. Non-limiting examples of suitable mixers utilized for mixing and feeding are disclosed in U.S. Pat. Nos. 4,522,502; 4,642,222; 4,747,691; and 5,470,150, which are incorporated herein by reference. Non-limiting examples of suitable static mixers can be found in U.S. Pat. Nos. 3,067,987 and 4,051,065, which are incorporated herein by reference.

Once the water soluble polymer containing water-in-oil emulsion is made down into water, any other additives are added to the solution to form a treatment solution, which is then introduced into the portion of the subterranean formation.

Generally, the water soluble polymer of the present invention can be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

The water used in the aqueous treatment fluids of the present invention can be freshwater, saltwater (e.g., water containing one or more salts dissolved therein), brine (e.g., produced from subterranean formations), seawater, pit water, pond water—or- the like, or combinations thereof. Generally, the water used may be from any source, provided that it does not contain an excess of compounds that may adversely affect other components in the aqueous treatment fluid or the formation itself. The present invention is effective in all aqueous treating fluid waters.

The water soluble polymers of the present invention should be included in the aqueous treatment fluids of the present invention in an amount sufficient to provide the desired reduction of friction. In some embodiments, a water soluble polymer of the present invention may be present in an amount that is at least about 0.0025%, in some cases at least about 0.003%, in other cases at least about 0.0035% and in some instances at least about 0.05% by weight of the aqueous treatment fluid and can be up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous treatment fluid. The amount of the water soluble polymers included in the aqueous treatment fluids can be any value or range between any of the values recited above.

In some embodiments, the water soluble polymer of the present invention can be present in aqueous treatment fluids in an amount in the range of from about 0.0025% to about 0.025%, in some cases in the range of from about 0.0025% to less than about 0.01%, in other cases in the range of from about 0.0025% to about 0.009%, and in some situations in the range of from about 0.0025% to about 0.008%, by weight of the aqueous treatment fluid.

In embodiments of the invention, when the present water-in-oil emulsions are used, the amount of water soluble polymer in the aqueous treatment fluid can be at least about 5%, in some cases at least about 7.5%, in other cases at least about 10%, in some instances at least about 12.5%, in other instances at least about 15%, in some situations at least about 20%, and in other situations at least about 25% less than when water-in-oil emulsion containing a polymer of the same composition at a concentration of 30 weight percent or more are used in the in the aqueous treatment fluid.

In embodiments of the invention, the water-in-oil emulsions according to the invention are used in the friction reducing treatment solution in an amount of at least about 0.1 gallons of water-in-oil emulsion per thousand gallons of aqueous treating fluid water (gpt), in some cases at least about 0.15 gpt, and in other cases at least about 0.2 gpt and can be up to about 3 gpt, in some cases up to about 2.5 gpt, in other cases up to about 2.0 gpt, in some instances up to about 1.5 gpt, and in other instances up to about 1.5 gpt. The amount of water-in-oil emulsion used in the friction reducing treatment solution can be any value or range between any of the values recited above.

In embodiments of the present invention, the aqueous treatment fluid contains 10,000 to 300,000 ppm of total dissolved solids. In particular embodiments, the total dissolved solids include at least 10 weight percent of a multivalent cation. In many embodiments of the invention, the any multivalent cation can be included and can include one or more selected from iron (in its ferrous and ferric forms), calcium, magnesium, manganese, strontium, barium, and zinc.

In embodiments of the invention, the aqueous treatment fluid can include total dissolved solids at a level of at least about 100 ppm, in some instances at least about 1,000 ppm, in other instances at least about 10,000 ppm, in some cases at least about 25,000 ppm and in other cases at least about 50,000 ppm and can be up to about 500,000 ppm, in certain cases up to about 400,000 ppm, in many cases up to about 300,000 ppm, in some cases up to about 250,000 ppm, in other cases up to about 200,000 ppm, in some instances up to about 100,000 ppm, in other instances up to about 50,000 ppm and in some situations up to about 25,000 ppm. The amount of total dissolved solids in the aqueous treatment solution can be any value or range between any of the values recited above.

In embodiments of the invention, the total dissolved solids in the aqueous treatment fluid can contain multivalent cations at a level of at least about 10%, in some cases at least about 15% and in other cases at least about 20% and can be up to about 50%, in some cases up to about 40% and in other cases up to about 35% by weight of the total dissolved solids. The amount of multivalent cation in the total dissolved solids in the aqueous treatment solution can be any value or range between any of the values recited above.

Additional additives can be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

The aqueous treatment fluids of the present invention can be used in any subterranean treatment where the reduction of friction is desired. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In some embodiments, the present invention provides a method of treating a portion of a subterranean formation that includes providing the above-described aqueous treatment fluid and introducing the aqueous treatment fluid into the portion of the subterranean formation. In some embodiments, the aqueous treatment fluid can be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present invention can also include preparing the aqueous treatment fluid. Preparing the aqueous treatment fluid can include providing the water soluble polymer containing water-in-oil emulsion and combining the water soluble polymer with the water to from the aqueous treatment fluid.

The present invention will further be described by reference to the following examples. The following examples are merely illustrative of the invention and are not intended to be limiting. Unless otherwise indicated, all percentages are by weight.

EXAMPLE 1

Preparation of water-in-oil emulsion polymers, percentages expressed as weight percent of the water-in-oil emulsion composition.

The water-in-oil emulsion composition used in the invention was prepared by combining softened water, acrylamide, cationic monomer, sulfonic acid containing monomer (as detailed in the table below), EDTA and 25% sodium hydroxide (to pH of 6.5) and stirring until uniform to form the aqueous phase (about 77.5%). The oil phase (about 21.5%) was made by combining an aliphatic hydrocarbon liquid (about 20%) with surfactants (ethoxylated amine (about 1.1%), sorbitan monooleate (about 0.15%), and polyoxyalkylene sorbitan monooleate (about 0.25%) with mixing. The aqueous phase was added to the oil phase with mixing to form a dispersion of the aqueous phase dispersed in the continuous oil phase. The dispersion was heated to an initiation temperature while sparging with nitrogen and sodium metabisulfite and an oil soluble peroxide initiator was added to the dispersion to initiate polymerization. Typically, the oil phase was added to a glass resin kettle and once agitation was begun, the aqueous phase was added to the resin kettle. The resulting dispersion was sparged with nitrogen for 30 minutes while the temperature was equilibrated to 25° C., at which time 37 microliters of peroxide was added to the stirring dispersion and 0.075% sodium metabisulfite (SMBS) solution was fed to the dispersion at a rate of 0.1 milliliters per minute. The polymerization temperature was controlled between 38° and 42° C. for approximately 90 minutes. Residual monomers were scavenged by feeding 25% sodium metabisulfite (SMBS) solution at a rate of 1.0 milliliters per minute. An inverting surfactant ($C_{12}$-$C_{14}$ 9-mole ethoxylate at about 1.4%) was blended into the water-in-oil polymer emulsion to aid in make-down on use and the dispersion was subsequently cooled to room temperature. The resulting water-in-oil emulsion contained about 30% of water soluble polymer.

| Sample | Acrylamide (%) | Cationic Monomer (%) | Sulfonic Acid Monomer (%) |
|---|---|---|---|
| A | 40 | 50 (AETAC) | 10 (NaAMPSA) |
| B | 40 | 20 (AETAC) | 20 (NaAMPSA) |
| C | 50 | 20 (AETAC) | 30 (NaAMPSA) |
| D | 40 | 40 (AETAC) | 20 (NaAMPSA) |
| E | 40 | 20 (AETAC) | 40 (NaAMPSA) |
| F | 40 | 60 (AETAC) | — |
| G (Comparative) | 40 | — | 60 (NaAMPSA) |
| H (Comparative) | 40 | — | 60 (acrylic acid) |
| I | 40 | 40 (MAPTAC) | 20 (NaAMPSA) |
| J (Comparative) | — | 100 (AETAC) | — |

Friction Flow Loop Testing

A friction flow loop was constructed from 5/16 37 inner diameter stainless steel tubing, approximately 30 feet in overall length. Test solutions were pumped out of the bottom of a tapered 5 gallon reservoir. The solution flowed through the tubing and was returned back into the reservoir. The flow is achieved using a plunger pump equipped with a variable speed drive. Pressure is measured from two inline gages, with the last gage located approximately 2 ft from the discharge back into reservoir.

Four gallons of brine solution (weight percent of salt indicated below) was prepared in the sample reservoir and the pump is started and set to deliver a flow rate of 5-10 gal/min. The salt solution is recirculated until the temperature equilibrates at 25° C. and a stabilized pressure differential is achieved. This pressure is recorded as the "initial pressure" of the brine solution. The test amount of neat water-in-oil emulsion polymer is quickly injected with a syringe into the sample reservoir containing the brine solution and a timer was started. The dose was recorded as gallons of water-in-oil emulsion per thousand gallons of brine solution (gpt). The pressure was recorded at 30 seconds, 1 min, 2 min and 3 min respectively. The pressure drop was calculated at each time interval comparing it to the initial pressure differential reading of the brine solution. The percentage friction reduction was determined as described in U.S. Pat. No. 7,004,254 at col. 9, line 36 to col. 10, line 43. The results are shown in the table below, dose is the amount of water-in-oil emulsion used as gallons per thousand gallons of brine solution.

| | | | | Friction Reduction (%) | | | |
|---|---|---|---|---|---|---|---|
| Run No. | Emulsion Sample | Brine | Dose (gpt) | 30 sec. | 1 min. | 2 min. | 3 min. |
| 1 | A | 15% $CaCl_2$ | 1 | 63.3 | 70.5 | 72.6 | 71.3 |
| 2 | A | 15% NaCl | 1 | 46.8 | 61.6 | 72.2 | 74.7 |
| 3 | B | 15% $CaCl_2$ | 1 | 67.5 | 70 | 70.8 | 69.6 |
| 4 | B | 15% $CaCl_2$ | 2 | 70.8 | 72.1 | 72.5 | 72.9 |
| 5 | B | 15% NaCl | 1 | 28.6 | 45.8 | 58 | 60.9 |
| 6 | B | 15% NaCl | 2 | 59.7 | 71.5 | 73.5 | 74.4 |
| 7 | C | 15% $CaCl_2$ | 1 | 37.7 | 53 | 58.5 | 59.3 |
| 8 | C | 15% NaCl | 1 | 25.5 | 42.1 | 60.7 | 66 |
| 9 | D | 15% $CaCl_2$ | 1 | 66.2 | 72.2 | 73.4 | 73.4 |
| 10 | D | 15% $CaCl_2$ | 2 | 69.2 | 70.8 | 71.3 | 71.7 |
| 11 | D | 15% NaCl | 1 | 34 | 56.2 | 69.4 | 73.2 |
| 12 | D | 15% NaCl | 2 | 50.2 | 68.4 | 73.8 | 75.5 |
| 13 | E | 15% $CaCl_2$ | 1 | 44.5 | 61.3 | 68.5 | 69.3 |
| 14 | E | 15% NaCl | 1 | 34.1 | 53 | 69.4 | 72.8 |
| 15 | F | 15% $CaCl_2$ | 1 | 44.5 | 61.3 | 68.5 | 69.3 |

-continued

| | | | Friction Reduction (%) | | | | |
|---|---|---|---|---|---|---|---|
| Run No. | Emulsion Sample | Brine | Dose (gpt) | 30 sec. | 1 min. | 2 min. | 3 min. |
| 16 | F | 15% NaCl | 1 | 34.1 | 53 | 69.4 | 72.8 |
| 17 | G | 15% $CaCl_2$ | 2 | 22.9 | 29.6 | 39.6 | 44.6 |
| 18 | H | 15% $CaCl_2$ | 2 | 0.8 | 2.1 | 3.8 | 3.8 |
| 19 | I | 15% $CaCl_2$ | 2 | 34.6 | 45.7 | 51.3 | 53.8 |
| 20 | I | 15% NaCl | 2 | 10.3 | 17.2 | 27.9 | 39.5 |
| 21 | J | 15% NaCl | 1 | 27.7 | 36.2 | 48.1 | 49.4 |

The data show several trends. First, the improvement in friction reduction provided by the inventive water soluble polymers is typically better in all of the high brine solutions tested, but surprisingly better in the calcium chloride brines; i.e., those containing a divalent cation compared to non-inventive polymers. Second, the trend in improvement in some cases appears to be more significant when the ratio of cationic monomer to sulfonic acid containing monomer is 2:1 or greater or 1:2 or less; i.e., when there is an excess of one charge compared to another.

EXAMPLE 2

Preparation of water-in-oil emulsion polymers, percentages expressed as weight percent of the water-in-oil emulsion composition.

The water-in-oil emulsion composition used in the invention was prepared by combining softened water, acrylamide, NaAMPSA, AETAC, and/or MCAT (N,N-Dimethylaminoethyl Acrylate), EDTA and 25% sodium hydroxide (to pH of 6.5) and stirring until uniform to form the aqueous phase (about 77.5%). The oil phase (about 21.5%) was made by combining an aliphatic hydrocarbon liquid (about 20%) with surfactants (ethoxylated amine (about 1.1%), sorbitan monooleate (about 0.15%), and polyoxyalkylene sorbitan monooleate (about 0.25%) with mixing. The aqueous phase was added to the oil phase with mixing to form a dispersion of the aqueous phase dispersed in the continuous oil phase. The dispersion was heated to an initiation temperature while sparging with nitrogen and sodium metabisulfite and an oil soluble peroxide initiator was added to the dispersion to initiate polymerization. Typically, the oil phase was added to a glass resin kettle and once agitation was begun, the aqueous phase was added to the resin kettle. The resulting dispersion was sparged with nitrogen for 30 minutes while the temperature was equilibrated to 25° C., at which time 37 microliters of peroxide was added to the stirring dispersion and 0.075% sodium metabisulfite (SMBS) solution was fed to the dispersion at a rate of 0.1 milliliters per minute. The polymerization temperature was controlled between 38° and 42° C. for approximately 90 minutes. Residual monomers were scavenged by feeding 25% sodium metabisulfite (SMBS) solution at a rate of 1.0 milliliters per minute. An inverting surfactant (about 1.4%) was blended into the water-in-oil polymer emulsion to aid in make-down on use and the dispersion was subsequently cooled to room temperature. The resulting water-in-oil emulsion contained about 30% of water soluble polymer.

| Sample | Acrylamide (%) | Cationic Monomer (%) | AMPSA (%) |
|---|---|---|---|
| K | 40 | 38 (AETAC)<br>12 (MCAT) | 10 |
| L | 46 | 34 (AETAC)<br>11 (MCAT) | 9 |
| M | 52 | 30 (AETAC)<br>10 (MCAT) | 8 |
| N | 56 | 28 (AETAC)<br>9 (MCAT) | 8 |
| O | 61 | 18 (AETAC) | 21 |
| P | 55 | 24 (AETAC) | 24 |
| Q (Comparative) | 70 | — | 30 (acrylic acid) |

Friction Flow Loop Testing

A friction flow loop was constructed from 5/16 "inner diameter stainless steel tubing, approximately 30 feet in overall length. Test solutions were pumped out of the bottom of a tapered 5 gallon reservoir. The solution flowed through the tubing and was returned back into the reservoir. The flow is achieved using a plunger pump equipped with a variable speed drive. Pressure is measured from two inline gages, with the last gage located approximately 2 ft from the discharge back into reservoir.

Four gallons of brine solution (weight percent of salt indicated below) was prepared in the sample reservoir and the pump is started and set to deliver a flow rate of 5-10 gal/min. The salt solution is recirculated until the temperature equilibrates at 25° C. and a stabilized pressure differential is achieved. This pressure is recorded as the "initial pressure" of the brine solution. The test amount of neat water-in-oil emulsion polymer is quickly injected with a syringe into the sample reservoir containing the brine solution and a timer was started. The dose was recorded as gallons of water-in-oil emulsion per thousand gallons of brine solution (gpt). The pressure was recorded at 30 seconds, 1 min, 2 min and 3 min respectively. The pressure drop was calculated at each time interval comparing it to the initial pressure differential reading of the brine solution. The percentage friction reduction was determined as described in U.S. Pat. No. 7,004,254 at col. 9, line 36 to col. 10, line 43. The brine used was an aqueous solution containing 165,000 ppm total dissolved solids including about 43,430 ppm sodium, 3,670 ppm magnesium, 14,400 ppm calcium and 103,290 ppm chloride. The results are shown in the table below. The dose is the amount of water-in-oil emulsion used as gallons per thousand gallons of brine solution.

| | | | Friction Reduction (%) | | | |
|---|---|---|---|---|---|---|
| Run No. | Emulsion Sample | Dose (gpt) | 30 sec. | 1 min. | 2 min. | 3 min. |
| 22 | K | 1 | 72.5 | 72.5 | 72.5 | 71.7 |
| 23 | L | 1 | 71.4 | 71.8 | 71.0 | 70.6 |
| 24 | M | 1 | 71.4 | 71.4 | 71 | 70.6 |
| 25 | N | 1 | 71.4 | 71.4 | 71 | 70.6 |
| 26 | O | 1 | 70.7 | 70.7 | 70.3 | 69.9 |
| 27 | P | 1 | 72 | 71.6 | 71.6 | 72 |
| 28 | Q )Comp.) | 1 | 5.7 | 10.7 | 22.8 | 31.4 |

The data show an improvement in friction reduction provided by the inventive water soluble polymers (Am/AMPSA/Cationic Monomer) compared with traditional Am/AA copolymers.

The samples above were evaluated as described above in a brine aqueous solution containing 247 ppm total dissolved solids including about 65 ppm sodium, 5.5 ppm magnesium, 22 ppm calcium and 150 ppm chloride. The results are shown in the table below, dose is the amount of water-in-oil emulsion used as gallons per thousand gallons of brine solution. containing about 247,000 ppm total dissolved solids including about 65,010 ppm sodium, about 5,500 ppm magnesium, about 21.610 ppm calcium and about 154,930 ppm chloride. The results are shown in the table below.

| | | | Friction Reduction (%) | | | |
|---|---|---|---|---|---|---|
| Run No. | Emulsion Sample | Dose (gpt) | 30 sec. | 1 min. | 2 min. | 3 min. |
| 29 | K | 1 | 74.3 | 73.9 | 73.2 | 72.4 |
| 30 | L | 1 | 74.0 | 74.0 | 73.6 | 72.9 |
| 31 | M | 1 | 73.2 | 71.7 | 71.7 | 71.7 |
| 32 | N | 1 | 73.8 | 73.8 | 73.1 | 72.7 |
| 35 | Q (Comp.) | 1 | 5.6 | 11.1 | 21.2 | 29.1 |

The data show an improvement in friction reduction provided by the inventive water soluble polymers (Am/AMPSA/Cationic Monomer) compared with traditional Am/AA copolymers.

Thus, the water-in-oil polymer emulsion polymers according to the invention are able to provide significantly better friction reduction performance in high brine solutions compared to the prior art water-in-oil polymer emulsion polymers.

The present invention has been described with reference to specific details of particular embodiments thereof. It is not intended that such details be regarded as limitations upon the scope of the invention except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

We claim:

1. A friction reducing treatment solution comprising:
water;
from 100 to 500,000 ppm of total dissolved solids wherein the total dissolved solids comprise at least 10 weight percent of a divalent cation;
from 0.5 to 3 gallons of a water-in-oil emulsion per thousand gallons of treatment solution comprising an oil phase (O) and an aqueous phase (A) at an O/A ratio of from about 1:8 to about 10:1, wherein the oil phase is a continuous phase comprising an inert hydrophobic liquid;
wherein the aqueous phase is present as dispersed distinct particles in the oil phase and comprises water, a water soluble polymer, and surfactants; wherein the water soluble polymer comprises 30 to 60 weight percent of a non-ionic monomer, 5 to 50 weight percent of a sulfonic acid containing monomer, and 10 to 60 weight percent of a cationic monomer wherein the cationic monomer is one or more selected from the group consisting of (meth) acrylamidopropyltrimethyl ammonium halides, (meth)acryloyloxyethyltrimethyl ammonium halides, N,N-Dimethylaminoethyl (meth)acrylate, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide; and
wherein the water soluble polymer comprises from 5 to 40 weight percent of the water-in-oil emulsion; and
an inverting surfactant.

2. The friction reducing treatment solution according to claim 1, wherein the nonionic monomer is one or more selected from the group consisting of $C_1$-$C_3$ alkyl (meth) acrylates, $C_1$-$C_3$ N-alkyl (meth)acrylamide, (meth)acrylamide, N-vinylpyrrolidone, dimethyl(meth)acrylamide, N-vinyl acetamide, and N-vinyl formamide.

3. The friction reducing treatment solution according to claim 1, wherein the sulfonic acid containing monomer is one or more sulfonic acid containing monomers selected from the group consisting of 2-acrylamido-2-methylpropane sulfonic acid, 2-methacrylamido-2-methylpropane sulfonic acid, sulfonated styrene, vinyl sulfonic acids, and allyl ether sulfonic acids.

4. The friction reducing treatment solution according to claim 1, wherein the divalent cation is one or more selected from the group consisting of iron, calcium, magnesium, manganese, strontium, barium, and zinc.

5. The friction reducing treatment solution according to claim 1, wherein the water soluble polymer has a molecular weight in the range of from about 2,000,000 to about 30,000,000.

6. The friction reducing treatment solution according to claim 1, wherein the water soluble polymer has a reduced viscosity, as determined in a Ubbelhhde Capillary Viscometer at 0.05% by weight concentration of the polymer in 1M NaCl solution, at 30° C., pH 7, of from about 10 to about 40 dl/g.

7. The friction reducing treatment solution according to claim 1, wherein the water-in- oil emulsion comprises at least one of an inhibitor, a salt, or an inverting surfactant.

8. The friction reducing treatment solution according to claim 1, wherein the water-in- oil emulsion comprises ammonium salt, 4-methoxyphenol, and an ethoxylated $C_{12}$-$C_{16}$ alcohol.

9. The friction reducing treatment solution according to claim 1, wherein the inert hydrophobic liquid comprises a mixture of paraffinic hydrocarbons and napthenic hydrocarbons.

10. The friction reducing treatment solution according to claim 1, wherein the surfactants comprise a tall oil fatty acid diethanol amine, a polyoxyethylene (5) sorbitan monooleate, and a sorbitan monooleate.

11. The friction reducing treatment solution according to claim 1, wherein the water soluble polymer is substantially free of acrylic acid monomer units.

12. The friction reducing treatment solution according to claim 1, wherein the molar ratio of cationic monomer to sulfonic acid containing monomer is at least 1.5:1.

13. The friction reducing treatment solution according to claim 1, wherein the molar ratio of cationic monomer to sulfonic acid containing monomer is up to 1:1.5.

14. The friction reducing treatment solution according to claim 1, wherein the total dissolved solids comprise at least 10 weight percent of a multivalent cation.

15. The friction reducing treatment solution according to claims 1, wherein the total dissolved solids are from 10,000 to 400,000 ppm.

16. A method of treating a portion of a subterranean formation, comprising:

inverting the water-in-oil emulsion by adding it to water to form a the friction reducing treatment solution of claim 1; and introducing the treatment solution into the portion of the subterranean formation.

17. The method according to claim 16, wherein the friction reducing treatment solution contains the polymer in an amount of from about 0.0025% to about 4% based on the weight of the solution.

18. The method according to claim 16, wherein the friction reducing treatment solution is introduced into the portion of the subterranean formation at a rate and pressure sufficient to create or enhance one or more fractures in the portion of the subterranean formation.

19. The friction reducing treatment solution according to claim 1, wherein the cationic monomer and sulfonic acid containing monomer are present such that an excess of one charge is present relative to the other.

20. The friction reducing treatment solution according to claim 1, wherein the water soluble polymer comprises 20 to 50 weight percent of the cationic monomer.

21. The friction reducing treatment solution according to claim 1, wherein the multivalent cation is selected from the group consisting of calcium, magnesium, and combinations thereof.

* * * * *